United States Patent
Liu et al.

(10) Patent No.: US 11,951,901 B2
(45) Date of Patent: Apr. 9, 2024

(54) DISPLAY SYSTEM SUITABLE FOR VEHICLE AND METHOD FOR OPERATING SAME

(71) Applicant: Coretronic Corporation, Hsin-Chu (TW)

(72) Inventors: Jui-Ta Liu, Hsin-Chu (TW);
Wen-Chang Chien, Hsin-Chu (TW);
Tsung-Hsin Yeh, Hsin-Chu (TW);
Shao-Chi Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 89 days.

(21) Appl. No.: 17/138,937

(22) Filed: Dec. 31, 2020

(65) Prior Publication Data
US 2022/0203885 A1 Jun. 30, 2022

(51) Int. Cl.
*B60Q 1/32* (2006.01)
*B60K 37/02* (2006.01)
*B60K 37/06* (2006.01)
*B60Q 1/50* (2006.01)
*B60R 16/023* (2006.01)
*G06F 3/14* (2006.01)
*G09G 5/00* (2006.01)

(52) U.S. Cl.
CPC .............. *B60Q 1/323* (2013.01); *B60K 37/02* (2013.01); *B60K 37/06* (2013.01); *B60Q 1/50* (2013.01); *B60R 16/023* (2013.01); *G06F 3/14* (2013.01); *G09G 5/003* (2013.01); *B60K 2370/122* (2019.05); *B60Q 2400/40* (2013.01); *G09G 2330/02* (2013.01); *G09G 2380/10* (2013.01)

(58) Field of Classification Search
CPC ........... G06F 3/013; G06F 3/14; G09G 5/006; G09G 2320/08; G09G 2370/10; G09G 2320/0261; G09G 2320/0613; G09G 2370/04; G09G 2340/0407; G09G 2370/12; G09G 2360/144
See application file for complete search history.

(56) References Cited

U.S. PATENT DOCUMENTS

| 2014/0085470 | A1* | 3/2014 | Sako | .................. | G03B 21/2066 |
| | | | | | 348/148 |
| 2016/0275760 | A1* | 9/2016 | Block | ................... | G07F 19/203 |
| 2019/0155368 | A1* | 5/2019 | Branover | .............. | G06F 1/3228 |

FOREIGN PATENT DOCUMENTS

| CN | 106647341 | 5/2017 | | |
| CN | 110316115 | 10/2019 | | |
| TW | 201323260 | 6/2013 | | |
| WO | WO-9626570 A1 * | 8/1996 | ......... | B60G 17/0185 |
| WO | WO-2014023170 A1 * | 2/2014 | ............. | B60Q 1/323 |

* cited by examiner

*Primary Examiner* — Shaheda A Abdin
(74) *Attorney, Agent, or Firm* — JCIPRNET

(57) ABSTRACT

A display system suitable for a vehicle is provided. The display system suitable for the vehicle includes a center console, a processing device, and a display device. The center console is configured to generate a power sequence according to a customization setting, and the power sequence corresponds to content of a data table. The processing device is configured to receive the power sequence and decodes the power sequence through a lookup table to generate a decoding result. The lookup table includes the content of the data table. The display device is coupled to the processing device and is configured to display a display image according to the decoding result.

12 Claims, 4 Drawing Sheets

| center control | ms 30 | ms 30 | ms 30 | ms 30 | ms 30 | ms 30 | ms 30 | ms 30 | Video Play | M1 | M2 |
|---|---|---|---|---|---|---|---|---|---|---|---|
| 1 | L | H | L | H | H | H | H | L | 1 | 0 | 1 |
| 2 | L | H | L | H | H | H | H | L | 2 | 0 | 2 |
| 3 | L | H | L | H | L | H | H | L | 3 | 0 | 3 |
| 4 | L | H | L | H | L | H | H | L | 4 | 0 | 4 |
| 5 | L | H | L | L | H | H | H | L | 5 | 0 | 5 |
| 6 | L | H | L | L | L | L | H | L | 6 | 0 | 6 |
| 7 | L | H | L | L | L | L | L | L | 7 | 0 | 7 |
| 8 | L | H | L | L | L | L | L | L | 8 | 0 | 8 |
| 9 | L |   | L | H | H | H | H | L | 9 | 0 | 9 |
| 10 | L |   | L | H | L | H | H | L | 10 | 0 | 10 |
| 11 | L |   | L | H | L | H | H | L | 11 | 0 | 11 |
| 12 | L |   | L | H | L | H | H | L | 12 | 0 | 12 |

1321    1322    1323

| center control | ms 30 | ms 30 | ms 30 | ms 30 | ms 30 | ms 30 | ms 30 | ms 30 | Picture Play | M1 | M2 |
|---|---|---|---|---|---|---|---|---|---|---|---|
| 1 | L | H | L | H | H | H | L | L | 1 | 1 | 0 |
| 2 | L | H | L | H | H | H | L | L | 2 | 2 | 0 |
| 3 | L | H | H | H | H | L | L | L | 3 | 3 | 0 |
| 4 | L | H | H | L | L | L | L | L | 4 | 4 | 0 |
| 5 | L | H | H | H | H | L | L | L | 5 | 5 | 0 |
| 6 | L | H | H | L | L | L | L | L | 6 | 6 | 0 |
| 7 | L | H | H | L | L | L | L | L | 7 | 7 | 0 |
| 8 | L | H | H | L | L | L | L | L | 8 | 8 | 0 |

DISPLAY SYSTEM SUITABLE FOR VEHICLE AND METHOD FOR OPERATING SAME

BACKGROUND

Technical Field

The disclosure relates to a display system and a method for operating the same, and in particular, relates to a display system suitable for a vehicle and a method for operating the same.

Description of Related Art

With the continuous development of automotive electronics, some new and creative electronic products are increasingly applied to automobiles. The welcome light (e.g. puddle light) is a typical example. The welcome light is arranged at the bottom of the car door. When the car door is opened, the welcome light is lit to project a specific picture onto the ground. When the door is closed, the projected picture disappears. Besides, since the welcome light may illuminate the ground, passengers may see the ground clearly when getting on and off the car. In this way, factors that may affect safety, such as puddles, mud, gravel, etc., may be noticed immediately, and passenger safety may thus be accordingly enhanced.

Generally, in the manufacturing process of the welcome light, ID molding and coating are performed on an icon (e.g., the logo of the brand of the vehicle). Next, the welcome light is installed on the display device of the car door. Nevertheless, if the car owner wants to replace the icon of the welcome light, such replacement needs to be performed manually. In other words, the welcome light may not be conveniently installed and replaced. Therefore, a solution capable of facilitating convenient installation and replacement of the welcome light is urgently needed.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides a display system suitable for a vehicle and a method for operating the same aiming at facilitating convenient installation and replacement of a welcome light.

In an embodiment of the disclosure, the display system suitable for the vehicle includes a center console, a processing device, and a display device. The center console is configured to generate a power sequence according to a customization setting, and the power sequence corresponds to content of a data table. The processing device is configured to receive the power sequence and decodes the power sequence through a lookup table to generate a decoding result. The lookup table includes the content of the data table. The display device is coupled to the processing device and is configured to display a display image according to the decoding result.

In an embodiment of the disclosure, a method for operating a display system suitable for a vehicle includes the following steps. A power sequence is generated according to a customization setting by a center console of the display system. The power sequence corresponds to content of a data table. The power sequence is received by the processing device of the display system, and the power sequence is decoded through a lookup table to generate a decoding result. The lookup table includes the content of the data table. A display image is displayed by the display device of the display system according to the decoding result.

To sum up, in the disclosure, the center console may send the power sequence having the waveform characteristic to the processing and display device. The processing and display device decodes the power sequence to display the specified display content according to the decoded content. In this way, in the disclosure, the display content of the welcome light may be set through an existing central control computer in the vehicle, and the display content may therefore be conveniently switched.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view illustrating content of a lookup table according to an embodiment of the disclosure.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
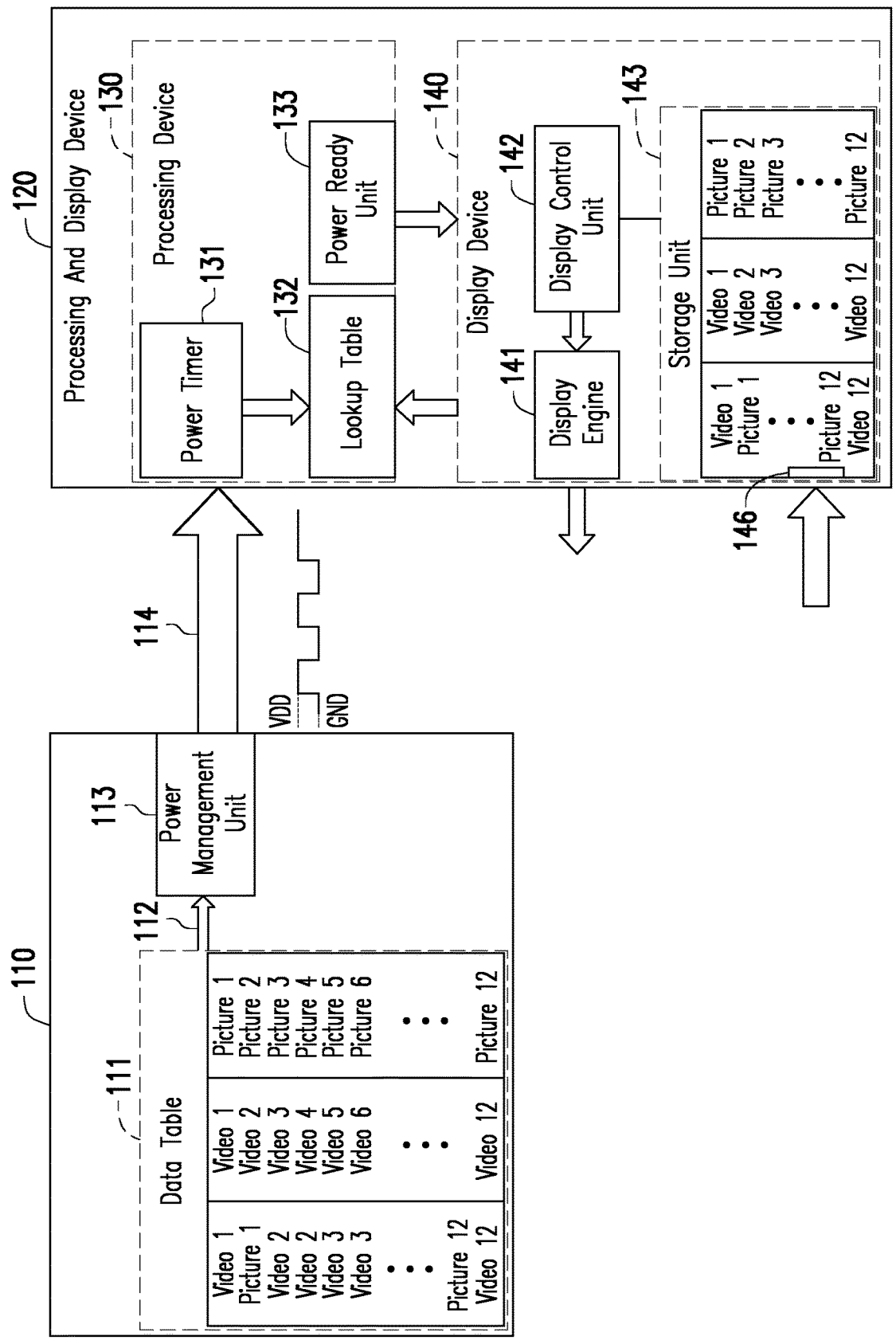
FIG. 1 is a block schematic view illustrating a display system according to an embodiment of the disclosure.

A display system and an operating method thereof provided by the disclosure may be applied to any vehicle having entrances and exits (e.g., car doors or hatch doors) such as a car, an airplane, a ship, and the like. FIG. 1 is a block schematic view illustrating a display system according to an embodiment of the disclosure. With reference to FIG. 1, a display system 100 includes a center console 110 and a processing and display device 120. The center console 110 and the processing and display device 120 are wired or wireless connected by a communication device. For example, the communication device of the disclosure may be Inter-Integrated Circuit ($I^2C$), wires, cables, Bluetooth, wireless network or infrared transceiver. In this embodiment, a vehicle may be a car, and the center console 110 may be an on-board computer or a central processing unit (CPU), etc. The center console 110 includes a storage unit having a data table 111 and a power management unit 113. A first storage unit is coupled to the power management unit 113 by the communication device. The first storage unit is configured to store the data table 111. The first storage unit may be a memory of any type, such as a programmable read only memory (PROM), a erasable programmable read only memory (EPROM) or an electrically erasable programmable read only memory (EEPROM). The power management unit 113 is, for example, a power management chip or a power management circuit.

Data of the data table 111 may be displayed through a car touch screen, and such data includes a plurality of options related to content displayed by a welcome light. Car touch screen may be a touch screen. A user may operate the car touch screen to select at least one piece of data in the data table 111 (hereinafter referred to as a customization setting 112). For instance, the user may set the content displayed by the welcome light to be a selected picture or a selected video through the car touch screen. Alternatively, the user may select both the picture and the video as the content to be displayed.

When the user selected the item (picture or/and video) of the car touch screen, the center console 110 generate the customization setting 112 corresponding the selected item from the data table 111 of the first storage unit. The power management unit 113 is configured to receive the information of the customization setting 112 to generate a power corresponding to the customization setting 112. Such power has a specific waveform characteristic in a time interval. In this embodiment, a voltage level of the power may be switched between a high voltage level (e.g., a power source voltage, represented by "H") and a low voltage level (e.g., a reference ground voltage GND, represented by "L"), so as to accordingly form the aforementioned waveform characteristic. For instance, when the customization setting 112 indicates that the user selects "picture 1" in the data table 111, the power management unit 113 may generate power (hereinafter referred to as a power sequence 114) having a waveform characteristic of "HHLHHHHL" in the time interval according to the customization setting 112. The time interval is, for example, 240 ms, and each potential switch may be maintained for 30 ms.

Figure 2:
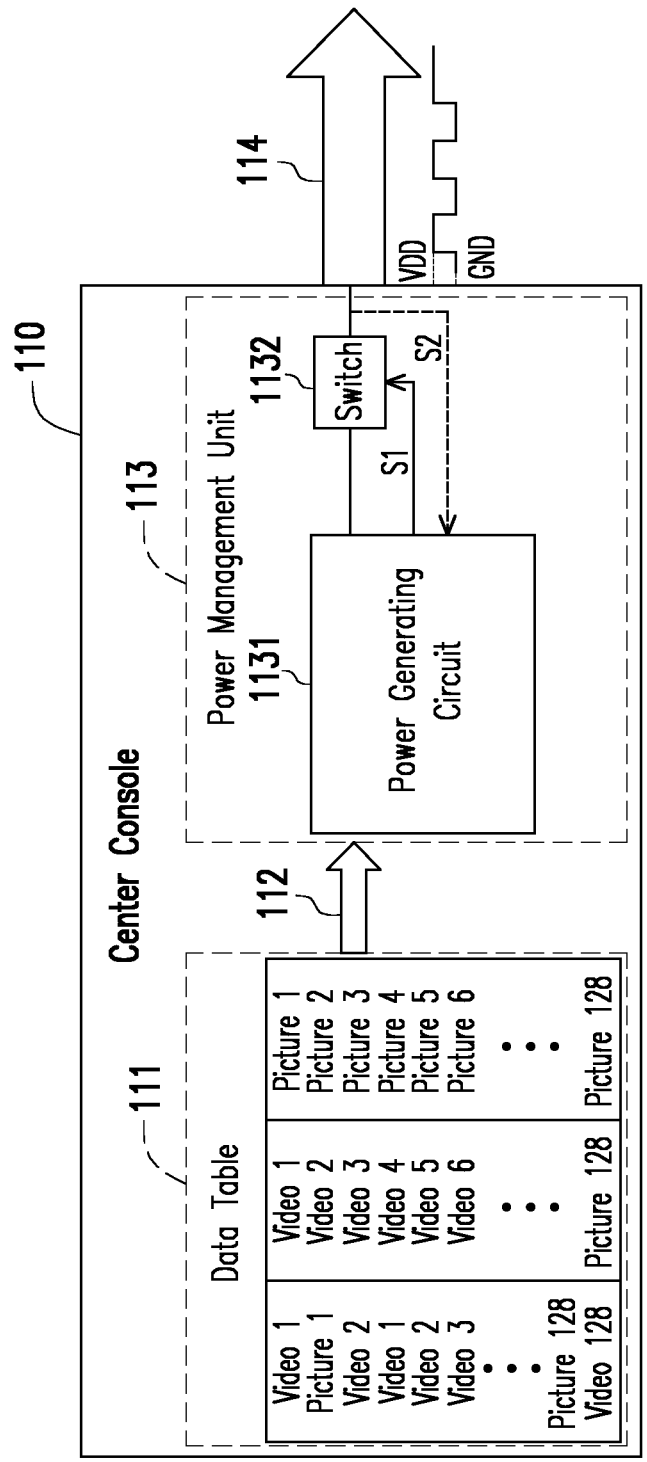
FIG. 2 is a block schematic view illustrating a structure of a center console in detail according to an embodiment of the disclosure.

FIG. 2 is a block schematic view illustrating a structure of a center console in detail according to an embodiment of the disclosure. With reference to FIG. 2, description of functions of the center console 110, the data table 111, the customization setting 112, and the power sequence 114 may be found with reference to the description of the elements with the same reference numerals in FIG. 1 and thus is not repeated herein. In FIG. 2, the power management unit 113 includes a power generating circuit 1131 and a switch 1132. The switch 1132 is a switch circuit. The power generating circuit 1131 is configured to generate power, that is, the power voltage. An electrical connection path is formed between the power generating circuit 1131 and an output end of the center console 110 by the communication device. The switch 1132 is disposed on the electrical connection path. The power generating circuit 1131 is further configured to generate a signal s1 according to the customization setting 112 to control operation of the power generating circuit 1131 to accordingly determine valid or invalid establishment of the electrical connection path. In this way, the power generating circuit 1131 and the switch 1132 may work together to generate power (i.e., the power sequence 114) having a waveform characteristic.

With reference to FIG. 1 again, the processing and display device 120 includes a processing device 130 and a display device 140, the processing and display device 120 may be a device with a processor and a display device, the processing device 130 and display device 140 are wired or wireless connected by the communication device. The processing device 130 includes a power timer 131, a second storage unit having a lookup table 132, and a power ready unit 133.

The processing device 130 is, for example, a microprocessor, a central processing unit (CPU), or a programmable microprocessor for general or special use, a digital signal processor (DSP), a programmable controller, an application specific integrated circuit (ASIC), a programmable logic device (PLD), other similar devices, or a combination of these devices.

The power timer 131 may be a timer circuit. The power ready unit 133 may be a power supply circuit. The second storage unit of the processing device 130 is coupled to the power timer 131. The second storage unit is configured to store the lookup table 132. The first, second storage unit and the storage unit 143 may be a memory of any type, such as a programmable read only memory (PROM), an erasable programmable read only memory (EPROM) or an electrically erasable programmable read only memory (EEPROM).

The power timer 131 is configured to receive the power sequence 114 to read the waveform characteristic of the power sequence 114 in the time interval, for example, to make comparison and perform identification according to a number of time periods of a power sequence change and length characteristics of the time periods. The power timer 131 may search the lookup table 132 in the second storage unit according to the waveform characteristic (e.g., "HHLHHHHL") to find display content corresponding to the waveform characteristic. Content of the lookup table 132 may be divided into a first section and a second section. The first section corresponds to a display type of the display content, and the second section corresponds to a display item of the display content.

FIG. 3 is a schematic view illustrating content of a lookup table according to an embodiment of the disclosure. With reference to FIG. 3, the lookup table 132 stores a plurality of pieces of sample data of the waveform characteristic and display type information and display item information corresponding to the sample data. In this embodiment, the sample data may be divided in to a first section 1321 and a second section 1322. For instance, when receiving the power sequence 114 having the waveform characteristic of "HHLHHHHL", the power timer 131 may search the corresponding display type and display item in the lookup table 132. To be specific, for example, the power timer 131 may determine that the corresponding display type is a picture according to the "HHL" in a first half of the "HHLHHHHL". The power timer 131 may determine that the corresponding display item is "1" according to the "HHHHL" in a second half of the "HHLHHHHL". At this time, the power timer 131 guides "0" indicating that the display type is a picture to store in a memory M1 of the second storage unit and guides "1" indicating that the display item is 1 to store in a memory M2 of the second storage unit. Each of the memory M1 and the memory M2 may be a memory of any type, such as an electrically-erasable programmable read-only memory (EEPROM). A third section 1323 in FIG. 3 refers to first continuous power supply after the power timer 131 completes decoding, and power supply time is greater than the decoding time (e.g., 240 ms). In such a situation, the power ready unit 133 begins supplying power to the display device 140, such that the display device 140 performs displaying according to data stored in the memory M1 and the memory M2.

In some embodiment of the disclosure, the display types and display items could be set as different waveform characteristic, for example, the display type indicating the picture could be set as "HLH" or "HHH".

With reference to FIG. 1 again, the display device 140 includes a display engine 141, a display control unit 142, and a storage unit 143. The storage unit 143 stores a plurality of pictures and a plurality of videos corresponding to content of the data table 111 in advance. When the power ready unit 133 supplies power to the display device 140, the display control unit 142 is configured to retrieve a corresponding picture and/or video in the storage unit 143 through reading the data stored in the memory M1 and the memory M2 (see FIG. 3) and transmits the corresponding picture and/or video to the display engine 141. The display control unit 142 may be a microprocessor, a central processing unit (CPU), or a programmable microprocessor for general or special use, a digital signal processor (DSP), a programmable controller, an application specific integrated circuit (ASIC), a programmable logic device (PLD), other similar devices, or a combination of these devices.

The display engine 141 is configured to perform displaying according to the data transmitted from the storage unit 143. For example, the display engine 141 may comprise Digital Micro-mirror Device (DMD), Liquid Crystal on Silicon (LCOS) or Transparent Liquid Crystal Panel. Such displaying is performed when a car door is opened, so that the center console 110 is further configured to determine whether the car door is opened according to a power supply state (a signal s2) of the car door. When the car door is opened, the center console 110 generates the power sequence 114, the power management unit 113 receives the signal s2 to determine the car door is opened. Note that in this embodiment, the processing and display device 120 includes a display device installed on the welcome light of the car door, which should however not be construed as limitations to the disclosure. In other embodiments, the processing and display device 120 may be installed in a driver's seat, a rear seat, a tail light, a car door, and a rearview mirror wherever displaying is required. Herein, the display device 140 may be a liquid crystal display (LCD) or a projection device. The display device 140 may further include an update interface 146 to allow the user to perform editing (including adding and deleting) on data stored in the storage unit 143 through the update interface 146. The update interface 146 may be a signal connector.

Figure 4:
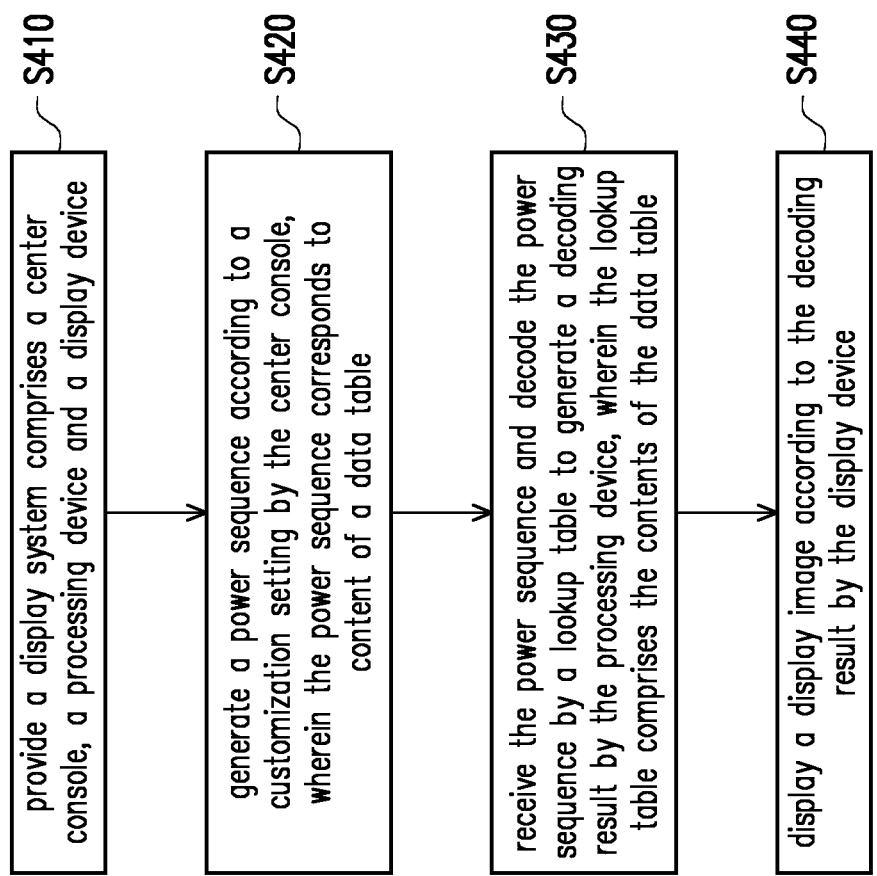
FIG. 4 is a flow chart illustrating steps of a method for operating a display system suitable for a vehicle according to an embodiment of the disclosure.

FIG. 4 is a flow chart illustrating steps of a method for operating a display system suitable for a vehicle according to an embodiment of the disclosure. With reference to FIG. 1 and FIG. 4 together, in step S410, the display system 100 is provided. The display system 100 includes the center console 110 and the processing and display device 120, and the processing and display device 120 includes the processing device 130 and the display device 140. In step S420, the center console 110 generates the power sequence 114 according to the customization setting 112. The power sequence 114 corresponds to content of the data table 111. In step S430, the processing device 130 receives the display device 140 and decodes the power sequence 114 through the lookup table 132 to generate a decoding result. The lookup table 132 includes the content of the data table 111. In step S440, the display device 140 displays a display image according to the decoding result.

In view of the foregoing, in the disclosure, the center console sends the power sequence having the waveform characteristic to the processing and display device. The processing and display device decodes the power sequence to display the specified display content according to the decoded content. In this way, in the disclosure, the display content of the welcome light may be set through an existing central control computer in the vehicle, and the display content may therefore be conveniently switched. The display system and the operating method thereof provided by the disclosure may be applied to any vehicle having entrances and exits (e.g., car doors or hatch doors) such as a car, an airplane, a ship, and the like. Further, applications thereof are not limited to the display content of the welcome light, and may be extended to, for example, a warning picture indicating an unclosed car door and any specified projection picture or video.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display system suitable for a vehicle, comprising:
a center console, configured to generate a power sequence corresponding to a picture or/and a video selected from content of a data table, and the picture or/and the video is set to be displayed by a welcome light of the vehicle, wherein the picture or/and the video selected from the content of the data table is stored in the center console;
a processing device, coupled to the center console, wherein the processing device is configured to receive the power sequence and configured to decode the power sequence based on a lookup table of the processing device to generate a decoding result, wherein the power sequence comprises a waveform characteristic determined by a plurality of changes between two voltage levels in a time interval, and the waveform characteristic comprises a first portion and a second portion, wherein based on the lookup table, the processing device is configured to determine an image type according to the first portion of the waveform characteristic, and configured to determine an image item according to the second portion of the waveform characteristic; and
a display device, coupled to the processing device, wherein the display device comprises a storage unit, and the storage unit of the display device is configured to store a plurality of pictures or/and videos corresponding to the content of the data table,
wherein according to the decoding result decoded from the power sequence, the display device is configured to:
retrieve the picture or/and the video from the plurality of pictures or/and videos stored in the storage unit of the display device; and
display the picture or/and the video used for the welcome light of the vehicle.

2. The display system as claimed in claim 1, wherein the center console comprises:
a switch; and
a power generating circuit, configured to control the switch to change a voltage level of the power sequence between a power voltage and a reference ground voltage to accordingly form the waveform characteristic.

3. The display system as claimed in claim 1, wherein the processing device comprises:
a power timer, configured to read the waveform characteristic of the power sequence in the time interval and search the lookup table to decode the power sequence.

4. The display system as claimed in claim 3, wherein the decoding result comprises the image type and the image item, and content of the lookup table comprises a first section and a second section, wherein the processing device is configured to compare the first portion of the waveform characteristic with the first section of the lookup table to determine the image type, and configured to compare the second portion of the waveform characteristic with the second section of the lookup table to determine the image item.

5. The display system as claimed in claim 3, wherein the display device comprises:
an update interface, configured to allow a user to edit the picture or/and the video.

6. The display system as claimed in claim 1, wherein the center console is further configured to monitor whether a car door of the vehicle is opened by reading the power sequence.

7. A method for operating a display system suitable for a vehicle, wherein the display system comprises a center console, a processing device coupled to the center console, and a display device coupled to the processing device, and the method comprises:
generating, by the center console, a power sequence corresponding to a picture or/and a video selected from content of a data table, and the picture or/and the video is set to be displayed by a welcome light of the vehicle, wherein the picture or/and the video selected from the content of the data table is stored in the center console;
receiving the power sequence by the processing device;
decoding, by the processing device, the power sequence based on a lookup table of the processing device to generate a decoding result, wherein the power sequence comprises a waveform characteristic determined by a plurality of changes between two voltage levels in a time interval, and the waveform characteristic comprises a first portion and a second portion, wherein based on the lookup table, the processing device is configured to determine an image type according to the first portion of the waveform characteristic, and configured to determine an image item according to the second portion of the waveform characteristic;
retrieving, by the display device, the picture or/and the video from a plurality of pictures or/and videos stored in a storage unit of the display device according to the decoding result decoded from the power sequence, wherein the storage unit of the display device is configured to store the plurality of pictures or/and videos corresponding to the content of the data table; and
displaying, by the display device, the picture or/and the video used for the welcome light of the vehicle according to the decoding result decoded from the power sequence.

8. The method for operating the display system suitable for the vehicle as claimed in claim 7, wherein the center console comprises a switch and a power generating circuit, and the method further comprises:
controlling, by the power generating circuit, the switch to change a voltage level of the power sequence between a power source voltage and a reference ground voltage to accordingly form the waveform characteristic.

9. The method for operating the display system suitable for the vehicle as claimed in claim 7, wherein the processing device comprises a power timer, and the method further comprises:
reading, by the power timer, the waveform characteristic of the power sequence in the time interval and searching the lookup table to decode the power sequence.

10. The method for operating the display system suitable for the vehicle as claimed in claim 9, wherein the decoding result comprises the image type and the image item, and content of the lookup table comprises a first section and a second section, wherein the processing device is configured to compare the first portion of the waveform characteristic with the first section of the lookup table to determine the image type, and configured to compare the second portion of the waveform characteristic with the second section of the lookup table to determine the image item.

11. The method for operating the display system suitable for the vehicle as claimed in claim 9, wherein the display device comprises an update interface, and the method further comprises:
allowing, by the update interface, a user to edit the picture or/and the video.

12. The method for operating the display system suitable for the vehicle as claimed in claim 7, wherein the method further comprises:

monitoring, by the center console, whether a car door of the vehicle is opened by reading the power sequence.

\* \* \* \* \*